United States Patent
Delia et al.

(10) Patent No.: US 8,103,257 B2
(45) Date of Patent: Jan. 24, 2012

(54) DATA TRANSMISSION METHOD AND SYSTEM

(75) Inventors: Wayne Michael Delia, Poughkeepsie, NY (US); Edward Emile Kelley, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 720 days.

(21) Appl. No.: 12/181,795

(22) Filed: Jul. 29, 2008

(65) Prior Publication Data

US 2010/0029304 A1    Feb. 4, 2010

(51) Int. Cl.
*H04W 4/00* (2009.01)
*G06F 15/16* (2006.01)
*H04M 11/00* (2006.01)
*H04M 1/00* (2006.01)
*H04M 3/42* (2006.01)
*H04M 1/725* (2006.01)

(52) U.S. Cl. .................. 455/414.1; 455/412.1; 455/418; 379/93.09; 379/355.02; 709/206

(58) Field of Classification Search .................. 455/466, 455/412.1, 412.2, 414.1; 379/93.09, 355.02; 709/206

See application file for complete search history.

(56) References Cited

U.S. PATENT DOCUMENTS

| 7,295,836 | B2 | 11/2007 | Yach et al. | |
| 7,839,987 | B1 * | 11/2010 | Kirchhoff et al. | 379/142.02 |
| 2009/0036149 | A1 * | 2/2009 | Liu et al. | 455/466 |

* cited by examiner

*Primary Examiner* — George Eng
*Assistant Examiner* — Muthuswamy Manoharan
(74) *Attorney, Agent, or Firm* — Schmeiser, Olsen & Watts; John Pivnichny

(57) ABSTRACT

A data transmission method and system. The method includes transmitting by a first wireless communication device to a second wireless communication device, first voice data associated with a first user. The first wireless communication device receives from the second wireless communication device, a verbal request for receiving text data. The first wireless communication device retrieves the text data. The first wireless communication device generates a transaction data object comprising the text data and a command for executing an executable program for performing an action with respect to the text data on the second wireless communication device. The first wireless communication device simultaneously transmits second voice data and the transaction data object to the second wireless communication device.

15 Claims, 6 Drawing Sheets

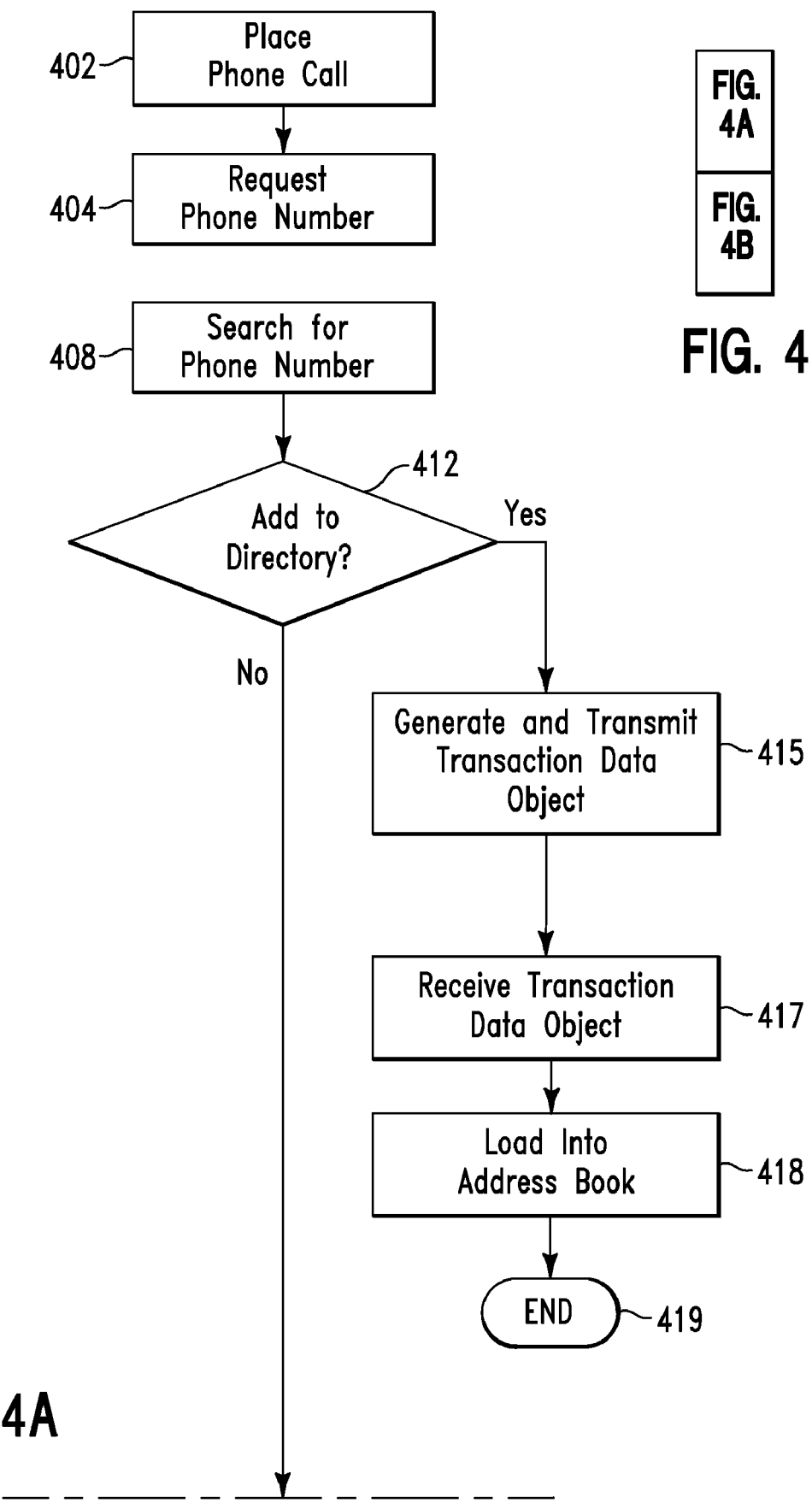

DATA TRANSMISSION METHOD AND SYSTEM

FIELD OF THE INVENTION

The present invention relates to a method and associated system for simultaneously transmitting voice data and text data between devices.

BACKGROUND OF THE INVENTION

Transmitting multiple signals typically comprises an inaccurate process with little flexibility. Accordingly, there exists a need in the art to overcome at least some of the deficiencies and limitations described herein above.

SUMMARY OF THE INVENTION

The present invention provides a method comprising:

enabling, by a first wireless communication device belonging to a first user, communications between said first wireless communication device and a second wireless device belonging to a second user;

transmitting, by said first wireless communication device to said second wireless communication device, first voice data associated with said first user;

receiving, by said first wireless communication device from said second wireless communication device, a verbal request for receiving specified text data, wherein said verbal request comprises voice data associated with said second user;

retrieving, by said first wireless communication device from a memory structure associated with said first wireless device, said specified text data;

receiving, by said first wireless communication device from said first user, a first request for generating a transaction data object associated with said specified text data;

generating, by said first wireless communication device in response to said first request, said transaction data object, wherein said transaction data object comprises said specified text data and a first command for automatically executing a first executable program for performing an action with respect to said specified text data on said second wireless communication device;

transmitting, by said first wireless communication device to said second wireless communication device, second voice data associated with said first user; and transmitting, by said first wireless communication device to said second wireless communication device, said transaction data object, wherein said transmitting transaction data object and said transmitting said second voice data occur simultaneously.

The present invention provides a method comprising:

enabling, by a first wireless communication device belonging to a first user, communications between said first wireless communication device and a second wireless device belonging to a second user;

receiving, by said first wireless communication device from said second wireless communication device, first voice data associated with said second user;

transmitting, by said first wireless communication device to said second wireless communication device, a verbal request for receiving specified text data, wherein said verbal request comprises voice data associated with said first user;

receiving, by said first wireless communication device from said second wireless communication device in response to said verbal request, a transaction data object associated with said specified text data, wherein said transaction data object comprises said specified text data and a first command for executing a first executable program for executing an action with respect to said specified text data, and wherein said first executable program in comprised by said first wireless communication device;

receiving, by said first wireless communication device from said second wireless communication device, second voice data associated with said second user; and executing, by said first wireless communication device in response to said first command, said first executable program; and automatically executing, by said first wireless communication device in response to said executing said first executable program, said action, wherein said receiving said second voice data and said automatically executing said action occur simultaneously.

The present invention advantageously provides a simple method and associated system capable of transmitting multiple signals.

BRIEF DESCRIPTION OF THE DRAWINGS

FIG. 4 which includes FIGS. 4A and 4B illustrates a flowchart describing an algorithm comprising process steps describing an implementation example for simultaneously transmitting voice data and text data between the electronic devices of FIG. 1, in accordance with embodiments of the present invention.

DETAILED DESCRIPTION OF THE INVENTION

Figure 1:
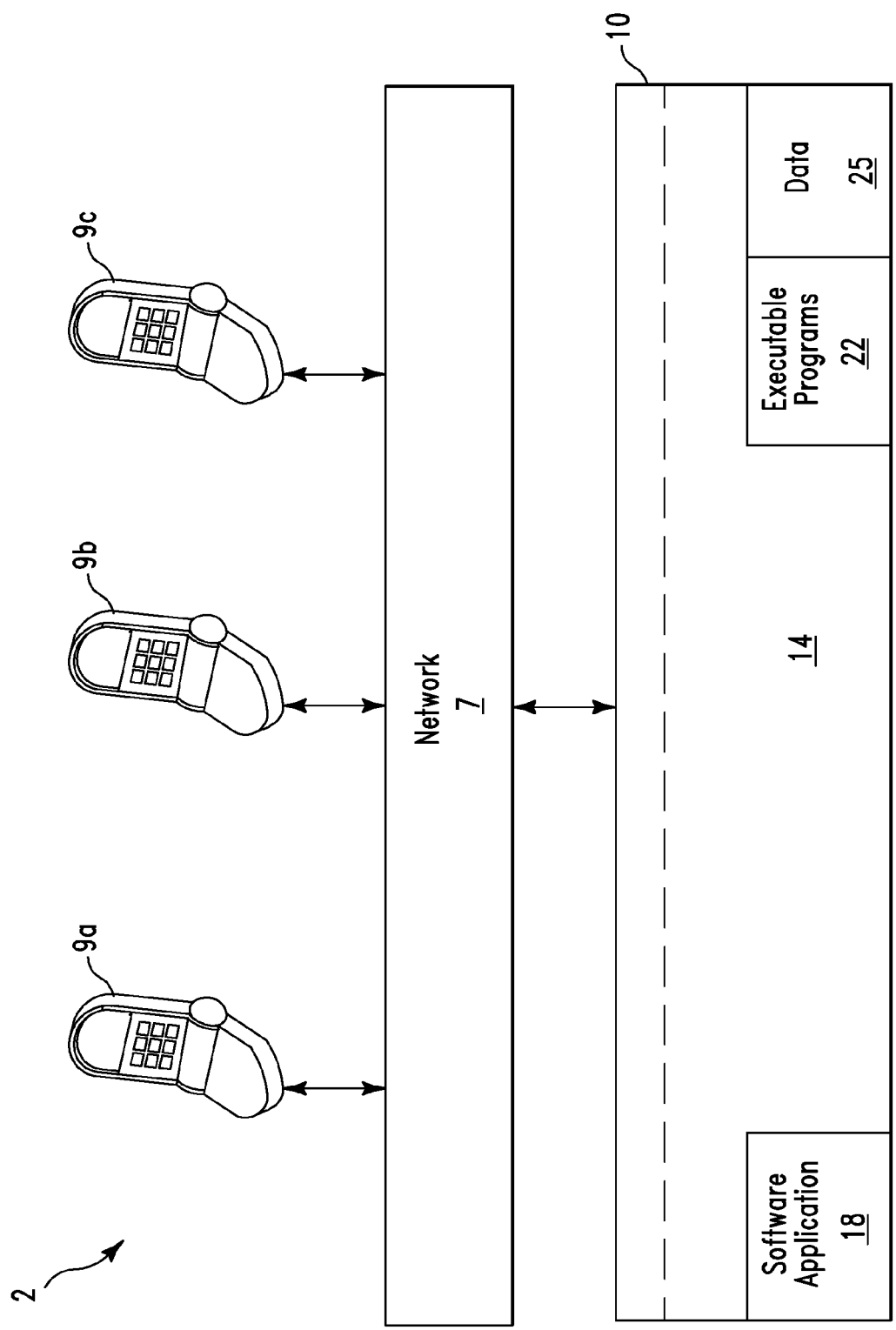
FIG. 1 illustrates a system for simultaneously transmitting voice data and text data between electronic devices, in accordance with embodiments of the present invention.

FIG. 1 illustrates a system 2 for simultaneously transmitting voice data and text data between electronic devices 9a, 9b, and 9c, in accordance with embodiments of the present invention. An electronic device (e.g., electronic devices 9a, 9b, and 9c) is defined herein as a device capable of generating, transmitting, and receiving electrical signals. Electronic devices 9a, 9b, and 9c may comprise any type of electronic device including, inter alia, a cellular telephone, a personal digital assistant (PDA), an audio/video device (e.g., an MP3 player/phone, a video game system etc), a computer, etc. Electronic devices 9a, 9b, and 9c may comprise wireless devices. System 2 comprises electronic devices 9a, 9b, and 9c connected to an optional computing system 10 through a network 7. Electronic devices 9a, 9b, and 9c may communicate with each other directly through network 7. Network 7 may comprise any type of communications network including, inter alia, a wireless network, a telephone network (wireless or landline), a local area network, (LAN), a wide area network (WAN), the Internet, etc. Computing system 10 may comprise any type of computing system(s) including, inter alia, a personal computer (PC), a server computer, a database computer, etc. Computing system 10 may comprise a single computing system or a plurality of computing systems. Computing system 10 comprises a memory system 14 (e.g., a database). Memory system 14 may comprise a single memory system. Alternatively, memory system 14 may comprise a plurality of memory systems. Memory system 14 may be internal to computing system (e.g., as illustrated in FIG. 1) or external to computing system 10. Memory system 14 comprises a software application 18, data 25, and executable programs 22. Software application 18 controls all functions associated with transmitting data 17 and executable programs 22 to electronic devices 9*a* and 9*b*. Additionally, software application 18 may control functions associated with generating executable programs 22. Alternatively, executable programs 22 may be generated by electronic devices 9*a* and 9*b*.

System 2 is used to facilitate communication of data between electronic devices 9*a* and 9*b* while a voice communication (i.e., a conversation) is in progress. The data may be stored in one of electronic devices 9*a* or 9*b* or may be used to issue a command for executing an executable program (e.g., for initiating a next telephone call to electronic device 9*c*). An operating system in electronic device 9*a* will allow an additional thread to begin which will allow a first user to select an item from a contact list while maintaining a phone conversation. The selected item will be transmitted to a second user (i.e., via electronic device 9*b*). The selected item may be transmitted via a text message. An operating system in electronic device 9*b* will start an additional thread to receive the text message while engaged in the conversation.

The following process steps illustrate an implementation example for simultaneously transmitting voice data and text data between electronic devices 9*a* and 9*b* in order transmit data and/or issue a command associated with electronic device 9*c*:

1. A first user using electronic device 9*a* calls (i.e., makes a phone call to) a second user using electronic device 9*b*.
2. The second user asks the first user for a third users phone number (i.e., for electronic device 9*c*). The third user's phone number is stored in the first user's phone contact list (i.e., in electronic device 9*a*).
3. While a conversation between the first user and the second user is in progress, the first user indicates through a user interface (i.e., in electronic device 9*a*) that he/she wishes to transmit information (i.e., the third user's phone number).
4. The first user selects appropriate contact information (e.g., the third user's phone number) to be transmitted to the second person during the currently active voice communication (i.e., the conversation).
5. Electronic device 9*a* transmits the contact information and an optional command to electronic device 9*b* while the current phone call is in progress.
6. Electronic device 9*b* (i.e., comprising an executable program) receives the information, displays it, optionally stores it in the second users contact book (i.e., in electronic device 9*b*), and optionally queues it up for immediate use.
7. After the current call between the first user and the second user is disabled, electronic device 9*b* may automatically dial or connect to electronic device 9*c*.

Electronic device 9*a* is used to retrieve data and transmit the data to electronic device 9*b*. The data may be recognized (i.e., by electronic device 9*b*) as a command for configuring a stack input to queue up a subsequent action. Therefore, the data is recognized (i.e., by electronic device 9*b*) as a transaction and a designated program module (e.g., an executable program) acts on the data to insert information (e.g., a phone number) into a command queue after a current call is completed (i.e., in the case of automatically dialing a phone number). Alternatively, if the transaction is recognized as an address book entry, electronic device 9*b* may automatically insert the information immediately into an address book while a voice communication is in progress.

Figure 2:
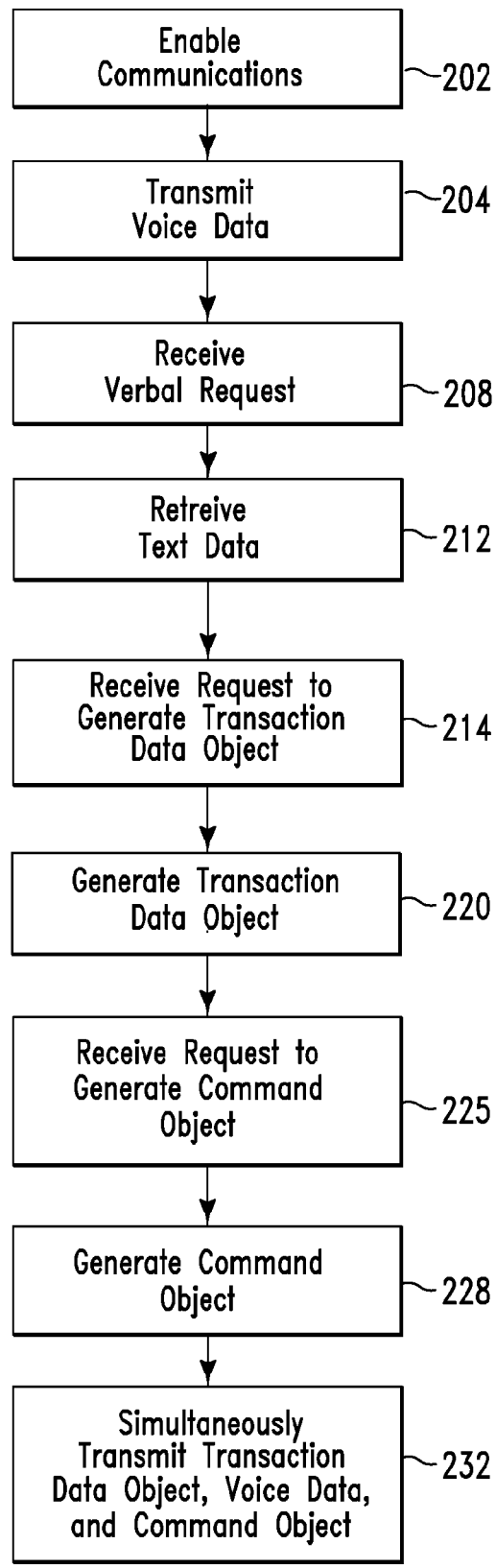
FIG. 2 illustrates a flowchart describing an algorithm used by a first electronic device of FIG. 1 for simultaneously transmitting voice data and text data to a second electronic device, in accordance with embodiments of the present invention.

FIG. 2 illustrates a flowchart describing an algorithm used by electronic device 9*a* of FIG. 1 for simultaneously transmitting voice data and text data to electronic device 9*b*, in accordance with embodiments of the present invention. In step 202, a first wireless communication device (e.g., electronic device 9*a* of FIG. 1) belonging to a first user enables communications between the first wireless communication device and a second wireless device (e.g., electronic device 9*b* of FIG. 1) belonging to a second user. In step 204, the first wireless communication device transmits voice data (i.e., a conversation) from the first user to the second wireless communication device. In step 208, the first wireless communication device receives a verbal request for receiving specified text data from the second wireless communication device. The verbal request comprises voice data associated with the second user. The specified text data may comprise, inter alia, a telephone number for a third wireless communication device (e.g., electronic device 9*c* of FIG. 1), contact information for a third user, etc. In step 212, the first wireless communication device retrieves the specified text data from a memory structure. The memory structure may be internal to the first wireless communication device (e.g., in an address book within a memory device in the first wireless communication device). Alternatively, the memory structure may be located external to the first wireless communication device (e.g., memory system 14 in FIG. 1). In step 214, (i.e., while having a conversation with the second user) the first user inputs a request (i.e., into the first wireless communication device) for generating a transaction data object associated with the specified text data. In step 220, the first wireless communication device generates the transaction data object. The transaction data object comprises the specified text data and a command for automatically executing a first executable program (i.e., in the second wireless device) for performing an action with respect to the specified text data. The first executable program may comprise computer code for, inter alia:

1. Automatically loading the specified text data in a specified directory within the second wireless communication device.
2. Automatically commanding the second user using the second wireless communication device to view and edit the specified text data.
3. Automatically enabling communications between the second wireless communication device and a third wireless communication device (e.g., electronic device 9*c* of FIG. 1) after communications between the first wireless communication device and the second wireless device are disabled.

The transaction data object may additionally comprise a second command for executing a second executable program for automatically storing the specified text data within a queue in the second wireless communication device. In optional step 225, (i.e., while having a conversation with the second user) the first user inputs a request (i.e., into the first wireless communication device) for generating a command object for automatically executing a second executable program on the second wireless device. In optional step 228, the first wireless communication device generates the command object. The command object may comprise commands for, inter alia:

1. Automatically enabling the second executable program for enabling an audible alarm on the second wireless device. The audible alarm indicates that transmitting the transaction data object has completed.
2. Automatically enabling the second executable program for disabling communications between the first wireless communication device and the second wireless device.
3. Automatically enabling the second executable program for enabling a visual indicator on the second wireless device. The visual indicator may indicate that an action has been executed.

In step 232, the first wireless communication device simultaneously transmits voice data, the transaction data object, and optionally the command object to said second wireless communication device.

Figure 3:
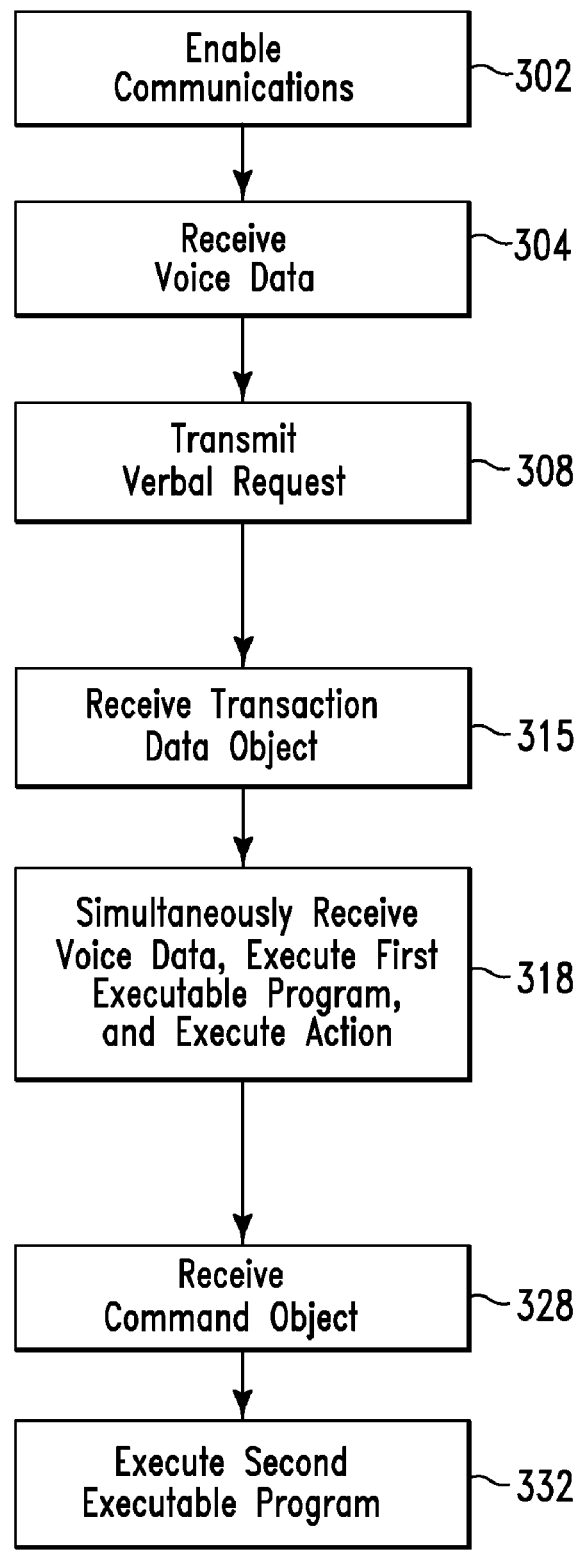
FIG. 3 illustrates a flowchart describing an algorithm used by a second electronic device of FIG. 1 for simultaneously receiving voice data and text data from a first electronic device, in accordance with embodiments of the present invention.

FIG. 3 illustrates a flowchart describing an algorithm used by electronic device 9b of FIG. 1 for simultaneously receiving voice data and text data from electronic device 9a, in accordance with embodiments of the present invention. In step 302, a first wireless communication device (e.g., electronic device 9b of FIG. 1) belonging to a first user enables communications between the first wireless communication device and a second wireless device (e.g., electronic device 9s of FIG. 1) belonging to a second user. In step 304, the first wireless communication device receives voice data (i.e., a conversation) from the second user using the second wireless communication device. In step 308, the first wireless communication device transmits a verbal request for receiving specified text data from said second wireless communication device. The verbal request comprises voice data associated with said first user. The specified text data may comprise, inter alia, a telephone number for a third wireless communication device (e.g., electronic device 9c of FIG. 1), contact information for a third user, etc. In step 315, the first wireless communication device receives (in response to the verbal request while having a conversation with the second user) a transaction data object associated with the specified text data from the second wireless communication device. The transaction data object comprises the specified text data and a command for automatically executing a first executable program (i.e., in the first wireless device) for performing an action with respect to the specified text data. The first executable program may comprise computer code for, inter alia:
1. Automatically loading the specified text data in a specified directory within the first wireless communication device.
2. Automatically commanding the first user using the first wireless communication device to view and edit the specified text data.
3. Automatically enabling communications between the first wireless communication device and a third wireless communication device (e.g., electronic device 9c of FIG. 1) after communications between the first wireless communication device and the second wireless device are disabled. The transaction data object may additionally comprise a second command for executing a second executable program for automatically storing the specified text data within a queue in the first wireless communication device. In step 318, the first wireless communication device simultaneously:
1. Receives voice data associated with the second user from the second wireless communication device.
2. Executes (i.e., in response to the first command) the first executable program.
3. Automatically executes the action.

In optional step 328, the first wireless communication device receives a command object. The command object may comprise commands for, inter alia:

1. Automatically enabling a second executable program (i.e., loaded on the first wireless communication device) for enabling an audible alarm on the first wireless device. The audible alarm indicates that receiving the transaction data object has completed.
2. Automatically enabling the second executable program for disabling communications between the first wireless communication device and the second wireless device.
3. Automatically enabling the second executable program for enabling a visual indicator on the first wireless device. The visual indicator may indicate that an action has been executed.

In step 332, the first wireless communication device automatically executes the second executable program based on commands from the command object.

Figure 4B:
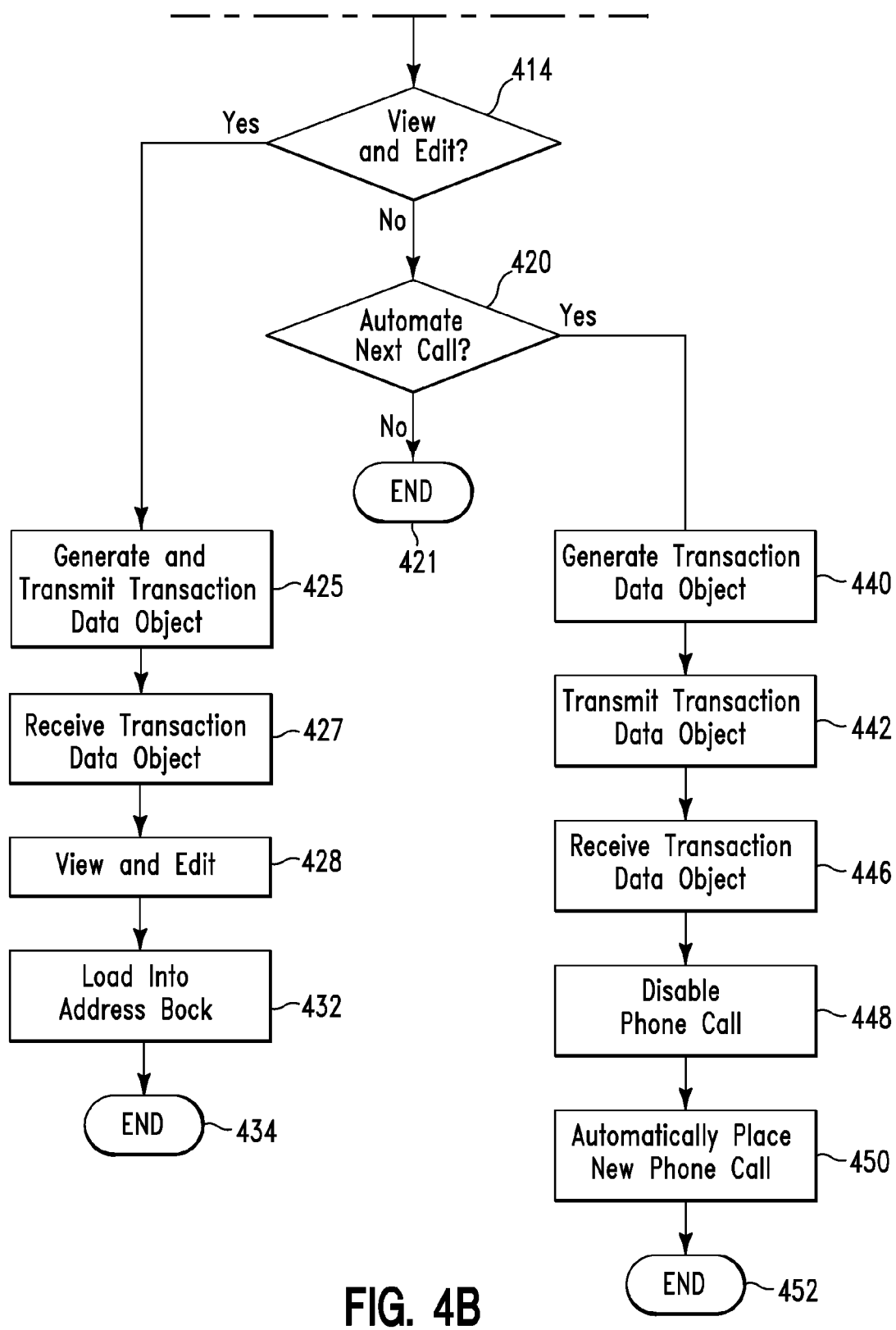

FIG. 4 which includes FIGS. 4A and 4B illustrates a flowchart describing an algorithm comprising process steps describing an implementation example for simultaneously transmitting voice data and text data between electronic devices 9a and 9b of FIG. 1, in accordance with embodiments of the present invention. In step 402, a first user (i.e., using a first cellular telephone) places a telephone call to a second user (i.e., using a second cellular telephone). In step 404, the second user asks the first user for a third user's telephone number which is stored in first user's cellular telephone contact list. In step 408, (i.e., while maintaining the telephone call in progress) a new thread A is started by the first cellular telephone and a search is conducted for the requested telephone number. In step 412, it is determined if the second user is requesting to have the requested telephone number added directly to his/her cellular telephone number directory.

If in step 412, it is determined that the second user is requesting to have the requested telephone number added directly to his/her cellular telephone number directory then in step 415 (i.e., while the telephone call between the first user and the second user is in progress and using the recently initiated thread A), the first user indicates through the first cellular telephone user interface that he/she wishes to transmit information to the second user. Additionally, a transaction data object is generated. The transaction data object comprises an indicator used to directly update the cellular telephone directory and the requested telephone number information (i.e., located during the recent search). The transaction data object is transmitted to the second cellular telephone. In step 417, the transaction data object is received in a queue internal to the second cellular telephone. A thread B is initiated to process the transaction data object. The transaction data object is read and the indicator directs the system to load the cellular telephone information directly into the second cellular telephone directory. In step 418, the requested telephone number is loaded into the address book of the second cellular telephone and the process is terminated in step 419.

If in step 412, it is determined that the second user is not requesting to have the requested telephone number added directly to his/her cellular telephone number directory then in step 414, it is determined if the second user would like to have the requested telephone number appear on his/her screen (i.e., on the second cellular telephone) to be edited before placing in the phone directory.

If in step 414, it is determined if the second user would like to have the requested telephone number appear on his/her screen (i.e., on the second cellular telephone) to be edited before placing in the phone directory then in step 425, the first cellular telephone generates a transaction data object comprising the requested telephone information (e.g., telephone number) and an indicator which will alert the second cellular telephone to view and edit the requested telephone information. The transaction data object is transmitted to the second cellular telephone. In step 427, second cellular telephone receives the transaction data object and initiates a thread B to process the transaction data object. In step 428, the requested telephone information from the transaction data object is placed on a display of the second cellular telephone so that it may be viewed and edited by the second user. In step 432, the edited transaction data object is loaded into the address book of the second cellular telephone and the process is terminated in step 434.

If in step 414, it is determined if the second user would not like to have the requested telephone number appear on his/her screen (i.e., on the second cellular telephone) to be edited before placing in the phone directory then in step 420, it is determined if the second user would like to automate the next telephone call (i.e., using the requested telephone information) on the second cellular telephone. Automation of the next telephone call comprises automatically dialing the requested telephone number when the telephone phone call between the first and second cellular telephones has terminated.

If in step 420, it is determined that the second user would not like to automate the next telephone call (i.e., using the requested telephone information) on the second cellular telephone then the process is terminated in step 421.

If in step 420, it is determined that the second user would like to automate the next telephone call (i.e., using the requested telephone information) on the second cellular telephone then in step 440, the first cellular telephone (i.e., using thread A) builds a transaction data object comprising an indicator for an automatic telephone call and the requested telephone number and name. In step 442, the first cellular telephone transmits the transaction data object to the second cellular telephone. In step 446, second cellular telephone receives the transaction data object and initiates a thread B. In step 448, the second cellular telephone disables the telephone call between the first cellular telephone and the second cellular telephone. In step 450, the second cellular telephone automatically dials the requested telephone number and the process is terminated in step 452.

Figure 5:
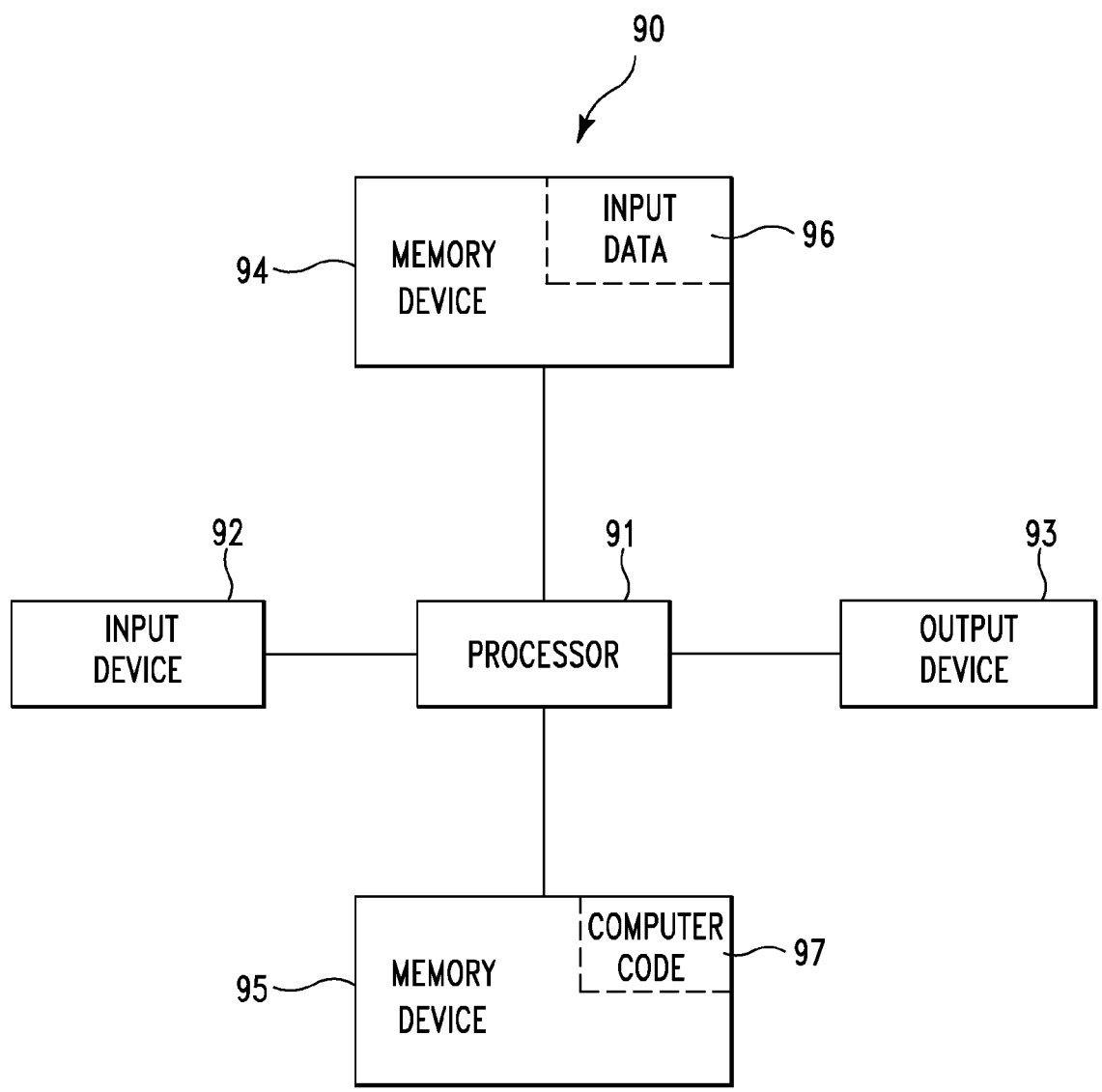
FIG. 5 illustrates a computer apparatus used for simultaneously transmitting voice data and text data between electronic devices, in accordance with embodiments of the present invention.

FIG. 5 illustrates a computer apparatus 90 (e.g., computing system 10, electronic device 9a, or electronic device 9b of FIG. 1) used for simultaneously transmitting voice data and text data between electronic devices, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2-4) for simultaneously transmitting voice data and text data between electronic devices. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 3) may comprise the algorithms of FIGS. 2-4 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be created, integrated, hosted, maintained, deployed, managed, serviced, etc. by a service provider who offers to simultaneously transmit voice data and text data between electronic devices. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for simultaneously transmitting voice data and text data between electronic devices. In another embodiment, the invention provides a business method that performs the process steps of the invention on a subscription, advertising, and/or fee basis. That is, a service provider, such as a Solution Integrator, could offer to perform a process for simultaneously transmitting voice data and text data between electronic devices. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method comprising:

enabling, by a first wireless communication device belonging to a first user, communications between said first wireless communication device and a second wireless device belonging to a second user;

transmitting, by said first wireless communication device to said second wireless communication device, first voice data associated with said first user;

receiving, by said first wireless communication device from said second wireless communication device, a verbal request for receiving specified text data, wherein said verbal request comprises voice data associated with said second user;

retrieving, by said first wireless communication device from a memory structure associated with said first wireless device, said specified text data;

receiving, by said first wireless communication device from said first user, a first request for generating a transaction data object associated with said specified text data;

generating, by said first wireless communication device in response to said first request, said transaction data object, wherein said transaction data object comprises said specified text data and a first command for automatically executing a first executable program for performing an action with respect to said specified text data on said second wireless communication device;

transmitting, by said first wireless communication device to said second wireless communication device, second voice data associated with said first user;

transmitting, by said first wireless communication device to said second wireless communication device, said transaction data object, wherein said transmitting transaction data object and said transmitting said second voice data occur simultaneously;

executing said transaction data object;

automatically loading in response to said executing said transaction data object, said specified text data in a specified directory within said second wireless communication device;

automatically storing in response to said executing said transaction data object, said specified text data in a queue within said second wireless communication device;

automatically enabling in response to said executing said transaction data object, said second user using said second wireless communication device to view and edit said specified text data;

receiving, by said first wireless communication device from said first user, a second request for generating a command object for automatically executing a second executable program on said second wireless device, wherein said command object comprises a second command, a third command, and a fourth command;

generating, by said first wireless communication device in response to said second request, said command object;

transmitting, by said first wireless communication device to said second wireless communication device, said command object, wherein said transmitting transaction data object and said transmitting said command object occur simultaneously;

executing said command object;

automatically enabling by said second command in response to said executing said command object, an audible alarm on said second wireless device indicating that said transmitting said transaction data object has completed;

automatically disabling by said third command in response to said executing said command object, said communications between said first wireless communication device and said second wireless device;

automatically enabling by said fourth command in response to said executing said command object, a visual indicator on said second wireless device, wherein said visual indicator indicates that said action has been executed; and automatically enabling in response to said executing said transaction data object and said automatically disabling said communications between said first wireless communication device and said second wireless device, communications between the second wireless communication device and a third wireless communication device.

2. The method of claim 1, wherein said first executable program comprises computer code for automatically loading said specified text data in a specified directory within said second wireless communication device, and wherein said automatically loading occurs simultaneously with said transmitting said second voice data.

3. The method of claim 1, wherein said first executable program comprises computer code for automatically enabling said second user using said second wireless communication device to view and edit said specified text data, and wherein said automatically enabling occurs simultaneously with said transmitting said second voice data.

4. The method of claim 1, wherein said first executable program comprises computer code for automatically enabling communications between said second wireless communication device and a third wireless communication device after said communications between said first wireless communication device and said second wireless device are disabled.

5. The method of claim 4, wherein said specified text data comprises a telephone number for said third wireless communication device, and wherein said automatically enabling communications between said second wireless communication device and said third wireless communication device comprises automatically dialing said telephone number.

6. The method of claim 1, wherein said memory structure is located external to said first wireless communication device.

7. The method of claim 1, wherein said first wireless communication device is a cellular telephone, and wherein said second wireless device is a cellular telephone.

8. A computer program product, comprising a computer storage medium comprising a computer readable program code embodied therein, said computer readable program code configured to perform the method of claim 1 upon being executed by a processor of said first wireless communication device.

9. A process for supporting computer infrastructure, said process comprising providing at least one support service for at least one of creating, integrating, hosting, maintaining, and deploying computer-readable code in said first wireless communication device, wherein the code in combination with said first wireless communication device is capable of performing the method of claim 1.

10. A method comprising:
enabling, by a first wireless communication device belonging to a first user, communications between said first wireless communication device and a second wireless device belonging to a second user;

receiving, by said first wireless communication device from said second wireless communication device, first voice data associated with said second user;

transmitting, by said first wireless communication device to said second wireless communication device, a verbal request for receiving specified text data, wherein said verbal request comprises voice data associated with said first user;

receiving, by said first wireless communication device from said second wireless communication device in response to said verbal request, a transaction data object associated with said specified text data, wherein said transaction data object comprises said specified text data and a first command for executing a first executable program for executing an action with respect to said specified text data, and wherein said first executable program in comprised by said first wireless communication device;

receiving, by said first wireless communication device from said second wireless communication device, second voice data associated with said second user; and executing, by said first wireless communication device in response to said first command, said first executable program;

automatically executing, by said first wireless communication device in response to said executing said first executable program, said action, wherein said receiving said second voice data and said automatically executing said action occur simultaneously;

executing said transaction data object;

automatically loading in response to said executing said transaction data object, said specified text data in a specified directory within said first wireless communication device;

automatically storing in response to said executing said transaction data object, said specified text data in a queue within said first wireless communication device;

automatically enabling in response to said executing said transaction data object, said first user using said first wireless communication device to view and edit said specified text data;

receiving, by said second wireless communication device from said second user, a second request for generating a command object for automatically executing a second executable program on said first wireless device, wherein said command object comprises a second command, a third command, and a fourth command;

generating, by said second wireless communication device in response to said second request, said command object;

transmitting, by said second wireless communication device to said first wireless communication device, said command object, wherein said transmitting transaction data object and said transmitting said command object occur simultaneously;

executing said command object;

automatically enabling by said second command in response to said executing said command object, an audible alarm on said first wireless device indicating that said transmitting said transaction data object has completed;

automatically disabling by said third command in response to said executing said command object, said communications between said first wireless communication device and said second wireless device;

automatically enabling by said fourth command in response to said executing said command object, a visual indicator on said first wireless device, wherein said visual indicator indicates that said action has been executed; and automatically enabling in response to said executing said transaction data object and said automatically disabling said communications between said first wireless communication device and said second wireless device, communications between the first wireless communication device and a third wireless communication device.

11. The method of claim 10, wherein said automatically executing said action comprises automatically loading said specified text data in a specified directory within said first wireless communication device.

12. The method of claim 10, wherein said automatically executing said action comprises automatically enabling said first user using said first wireless device to view and edit said specified text data.

13. The method of claim 10, wherein said specified text data comprises a telephone number for said third wireless communication device, and wherein said automatically enabling communications between said second wireless communication device and said third wireless communication device comprises automatically dialing said telephone number.

14. The method of claim 10, wherein said first wireless communication device is a cellular telephone, and wherein said second wireless device is a cellular telephone.

15. A computer program product, comprising a computer storage medium comprising a computer readable program code embodied therein, said computer readable program code configured to perform the method of claim 10 upon being executed by a processor of said first wireless communication device.

* * * * *